US009882852B2

(12) United States Patent
Koum et al.

(10) Patent No.: US 9,882,852 B2
(45) Date of Patent: Jan. 30, 2018

(54) TECHNIQUES FOR ESCALATING TEMPORARY MESSAGING BANS

(71) Applicant: WhatsApp Inc., Mountain View, CA (US)

(72) Inventors: Jan Koum, Santa Clara, CA (US); Brian Acton, Santa Clara, CA (US); Randall Sarafa, San Francisco, CA (US); Bryan Dennis O'Connor, Atherton, CA (US); Michael B Donohue, Mountain View, CA (US)

(73) Assignee: WHATSAPP INC., Menlo Park, CA (US)

( * ) Notice: Subject to any disclaimer, the term of this patent is extended or adjusted under 35 U.S.C. 154(b) by 269 days.

(21) Appl. No.: 14/708,711

(22) Filed: May 11, 2015

(65) Prior Publication Data
US 2016/0337293 A1 Nov. 17, 2016

(51) Int. Cl.
*G06F 15/16* (2006.01)
*H04L 12/58* (2006.01)
*H04L 29/08* (2006.01)

(52) U.S. Cl.
CPC .............. *H04L 51/16* (2013.01); *H04L 51/12* (2013.01); *H04L 67/22* (2013.01); *H04L 67/306* (2013.01)

(58) Field of Classification Search
CPC ........ H04L 67/22; H04L 67/306; H04L 51/12
USPC ....................................................... 709/206
See application file for complete search history.

(56) References Cited

U.S. PATENT DOCUMENTS

| | | | |
|---|---|---|---|
| 7,548,956 B1* | 6/2009 | Aoki | G06Q 10/107 709/204 |
| 2005/0203881 A1* | 9/2005 | Sakamoto | G06F 21/552 |
| 2006/0293956 A1* | 12/2006 | Walker | G06Q 30/0212 705/14.14 |
| 2007/0260603 A1* | 11/2007 | Tuscano | G06F 17/30867 |
| 2008/0249820 A1* | 10/2008 | Pathria | G06Q 10/10 705/2 |
| 2013/0018965 A1* | 1/2013 | Ramachandran | G06Q 50/01 709/206 |
| 2014/0278367 A1* | 9/2014 | Markman | G06F 17/2765 704/9 |

* cited by examiner

*Primary Examiner* — Phuoc Nguyen

(57) ABSTRACT

Techniques for escalating temporary messaging bans are described. In one embodiment, an apparatus may comprise a messaging server component operative to receive one or more messaging interactions from a messaging client on a client device at a messaging service, the messaging client associated with a user account for the messaging service; and impose a restriction on the user account from transmitting messaging using the messaging service for a duration based on a messaging ban duration; and an abuse monitoring component operative to analyze the one or more messaging interactions based on a plurality of messaging abuse criteria to determine that the user account meets a messaging abuse threshold; retrieve a messaging abuse punishment history for the user account; and determine a messaging ban duration based on the messaging abuse punishment history and the determination that the user account meets the messaging abuse threshold. Other embodiments are described and claimed.

20 Claims, 12 Drawing Sheets

*600*

Receive one or more messaging interactions from a messaging client on a client device at a messaging service, the messaging client associated with a user account for the messaging service.
*602*

Analyze the one or more messaging interactions based on a plurality of messaging abuse criteria to determine that the user account meets a messaging abuse threshold.
*604*

Retrieve a messaging abuse punishment history for the user account.
*606*

Determine a messaging ban duration based on the messaging abuse punishment history and the determination that the user account meets the messaging abuse threshold.
*608*

Impose a restriction on the user account from transmitting messaging using the messaging service for a duration based on the messaging ban duration.
*610*

*FIG. 6*

TECHNIQUES FOR ESCALATING TEMPORARY MESSAGING BANS

BACKGROUND

Users of mobile devices, such as smartphones, may use their mobile devices to execute applications. These applications may perform communications and network tasks on behalf of their user. An application may comprise a messaging client for messaging between users. In some instances, users may abuse the privilege of using a messaging service.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for escalating temporary messaging bans. Some embodiments are particularly directed to techniques for escalating temporary messaging bans with ban escalation and de-escalation based on re-analysis. In one embodiment, for example, an apparatus may comprise a messaging server component operative to receive one or more messaging interactions from a messaging client on a client device at a messaging service, the messaging client associated with a user account for the messaging service; and impose a restriction on the user account from transmitting messaging using the messaging service for a duration based on a messaging ban duration; and an abuse monitoring component operative to analyze the one or more messaging interactions based on a plurality of messaging abuse criteria to determine that the user account meets a messaging abuse threshold; retrieve a messaging abuse punishment history for the user account; and determine a messaging ban duration based on the messaging abuse punishment history and the determination that the user account meets the messaging abuse threshold. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
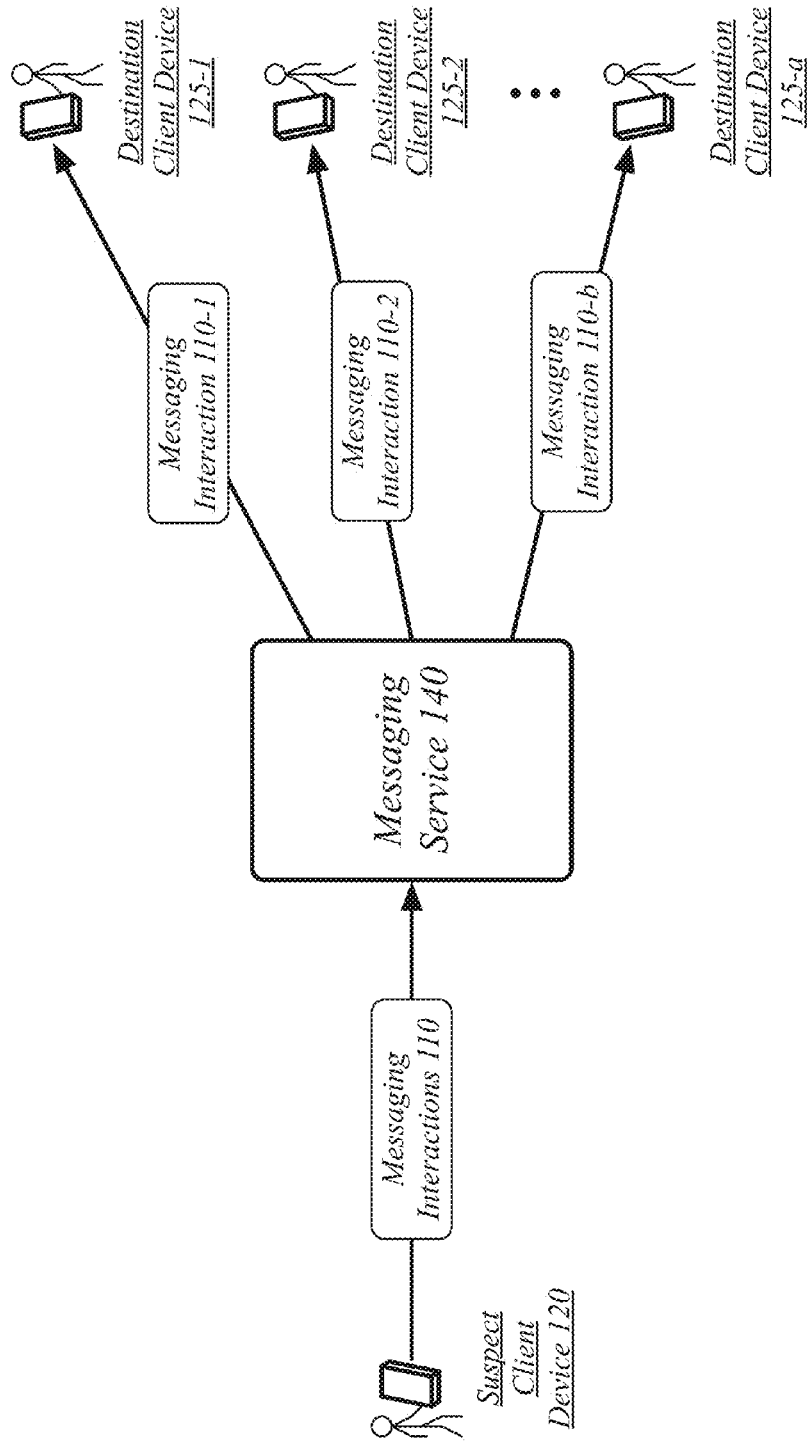
FIG. 1 illustrates an embodiment of a messaging abuse prevention system.

A messaging service may present a low bar for registering to use the service, demanding no more than an email address, phone number, or other contact identifier. This may increase the user base of the messaging service by preventing the messaging service from losing users that would be driven away if registering were an inconvenience.

However, this low bar for registering may empower the registration of users that may abuse the messaging service—spammers, harassers, and other unwanted users. As such, to avoid having these unwanted users degrade the experience of those using the messaging service appropriately, the messaging service may police the behavior of users and ban those whose behavior is indicative of abusive use of the messaging service.

Where a messaging service only uses permanent bans the administrators of the service may be hesitant to apply bans without strong evidence of unwanted behavior to avoid permanently removing a reasonable user from the service. Therefore, temporary bans—bans with a limited duration—may be preferable. Further, a user that has been improperly permanently banned may only be able to return to the service by contacting customer support and requesting a review of their ban, which absorbs the time of customer support staff. The use of permanent bans, particularly permanent bans that may not be necessary, may result in the use of a greater number of customer support staff, increasing the cost of running the messaging service.

An automated ban may be applied based on the analysis of various measures of the messaging behavior of a suspect user. Some of these measures may be dependent on the behavior of other users of the messaging service. For example, a suspect user that messages a large number of other users that have never messaged the suspect user and that have not added the suspect to their contact list may be suspected of spamming those other users. However, if those other users add the suspect user to their contact list after receiving the messages from the suspect user, or respond to the suspect user's message, that may indicate that the suspect user's messaging was reasonable. For example, it may be a new user or a returning user on a new device messaging friends that they have joined or rejoined the service and providing them with the account or contact information for messaging with them.

As such, messaging behavior that is initially suspicious may prove to have been legitimate once the receiving users have had the opportunity to respond to it. The messaging service may therefore lift the ban based on a re-analysis of the suspect user's messaging behavior. This may compliment the use of temporary bans instead of permanent bans as a temporarily banned user may be expected to return to the service to determine whether their temporary ban has yet been lifted, while a permanently banned user may not. A user that is banned and never returned is inaccessible to other users of the service, and, if they transition to another messaging service that doesn't ban them, can drive those other users to the other messaging service, which may produce a cascading effect that reduces or limits growth of the user population.

A similar analysis may be performed and determine that a suspect user's behavior is more suspect than it originally appeared to be. For example, if contacted users block the suspect user—in contrast to messaging or adding to their contact list—that may indicate that the suspect user's messages were distinctly unwanted. As such, the penalty for a ban may be increased, such as increasing the duration of a temporary ban, upgrading the temporary ban to a permanent ban, or increasing the scope of a temporary ban by removing any of the limited types of behavior (such as receiving or responding to messages) that may still be allowed during the temporary ban.

This re-analysis may be particularly valuable when encryption techniques—such as end-to-end encryption of message contact—is used to obscure the content of messages from the analysis of the messaging service. The messaging service may use encryption to ensure the privacy of their users, privacy extending even to protecting from data-mining by the messaging service. This privacy may, however, limit some of the techniques available for detecting unwanted behavior, such as by detecting the difference between a repeatedly-sent message notifying friends that a user has joined and a repeatedly-sent spam message. This may increase the importance of analyzing how other users react (e.g., blocking, responding, adding to contact list) to the suspect behavior, increasing the accuracy of punishments enforced by the messaging service and withdrawing punishments where appropriate.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging abuse prevention system 100. In one embodiment, the messaging abuse prevention system 100 may comprise a computer-implemented system having software applications comprising one or more components. Although the messaging abuse prevention system 100 shown in FIG. 1 has a limited number of elements in a certain topology, it may be appreciated that the messaging abuse prevention system 100 may include more or less elements in alternate topologies as desired for a given implementation.

A messaging service 140 may be generally arranged to receive, store, and deliver messages. The messaging service 140 may store messages while messaging clients, such as may execute on suspect client device 120 and destination client devices 125, are offline and deliver the messages once the messaging clients are available.

A suspect client device 120 and destination client device 125 may execute messaging clients for the messaging service 140, wherein each of the client devices 120, 125 and their respective messaging client are associated with a particular user of the messaging service 140. In some embodiments, the client devices 120, 125 may be cellular devices such as smartphones and may be identified to the messaging service 140 based on a phone number associated with each of the client devices 120, 125. In some embodiments, each messaging client may be associated with a user account registered with the messaging service 140. In general, each messaging client may be addressed through various techniques for the reception of messages. While in some embodiments the client devices 120, 125 may comprise cellular devices, in other embodiments one or more of the client devices 120, 125 may include personal computers, tablet devices, any other form of computing device without limitation.

The suspect client device 120 may request to engage in one or more messaging interactions 110 with one or more destination client devices 125. The messaging interactions 110 may comprise the transmission of a plurality of messages to a plurality of destination client devices 125. The messaging service 140 may evaluate one or more measures related to the request to perform the one or more messaging interactions 110 based on one or more criteria to determine that whether the suspect client device 120 has engaged in suspicious behavior that may warrant a temporary or permanent ban. The analysis of the messaging interactions 110 may incorporate any responsive behavior by the users of the destination client devices 125 that relate to the user of suspect client device 120 and/or the messaging interactions 110, and such responsive behavior may be incorporated into any re-analysis of the messaging interactions that may modify the response (e.g., penalty) imposed by the messaging service 140 to the messaging interactions 110.

It will be appreciated that the suspect client device 120 being labeled as "suspect" may not correspond to the suspect client device 120 being particularly selected or categorized for analysis as to whether its behavior is unwanted or abusive. The label "suspect" may be a post-facto descriptor applied in relation to the eventual determination that the behavior defined by the messaging interactions 110 was suspect. However, in some embodiments, new users to the messaging service 140 may be subject to particularly careful or sensitive analysis and particularly subject to being banned due to a lack of messaging history being one indicator of a user not being a reliable and appropriate user of the messaging service 140. In some cases, a new user may implicitly be subject to particularly sensitive analysis due to the analysis incorporating the totality of a user's messaging history and new users, therefore, being entirely defined by their recent (i.e., only) messaging history.

The messaging abuse prevention system 100 may use knowledge generated from interactions between users. The messaging abuse prevention system 100 may comprise a component of a social-networking service and may use knowledge generated from the broader interactions of the social-networking service. As such, to protect the privacy of the users of the messaging abuse prevention system 100 and/or a larger social-networking service, messaging abuse prevention system 100 may include an authorization server (or other suitable component(s)) that allows users to opt in to or opt out of having their actions logged by the messaging abuse prevention system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging abuse prevention system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2:
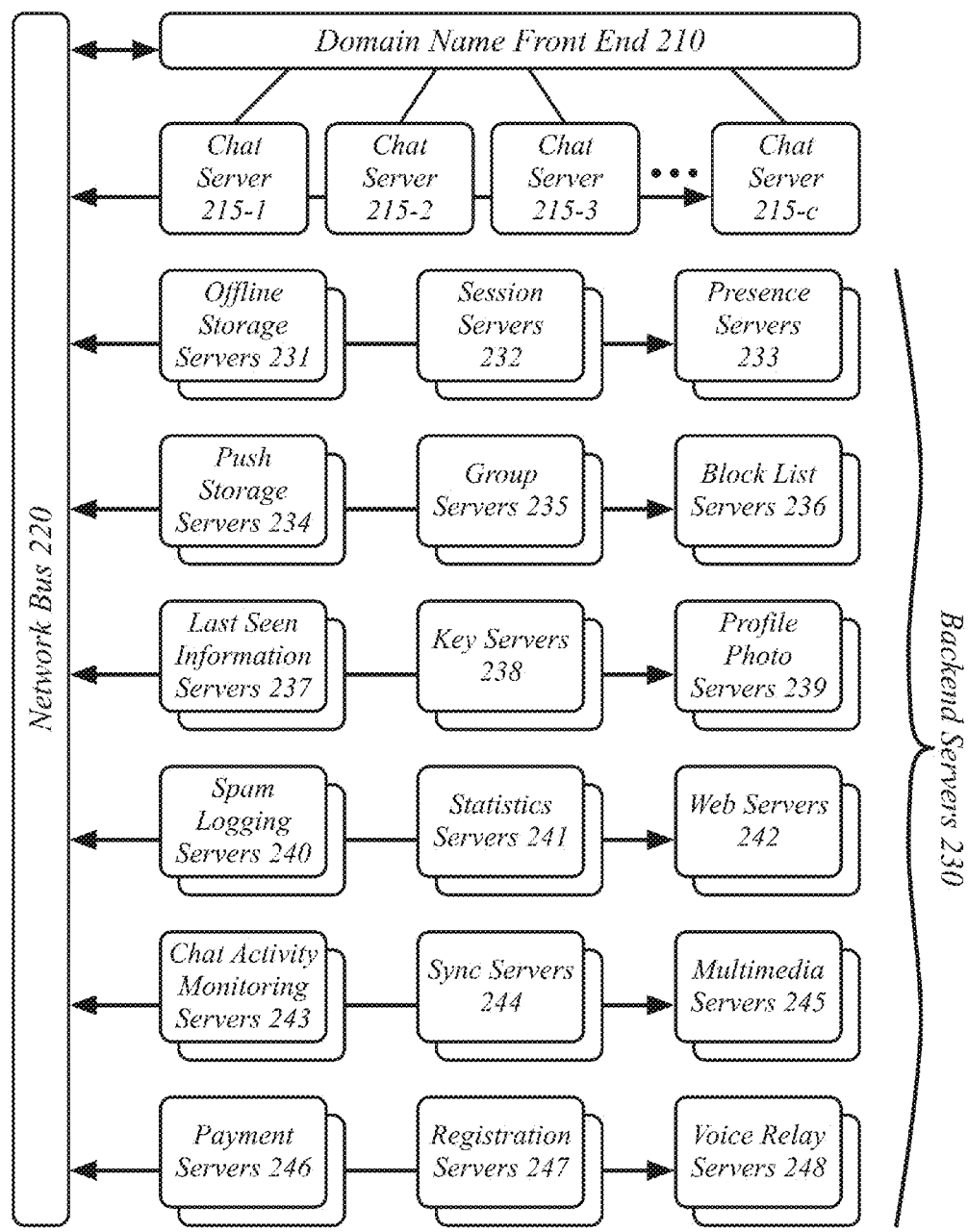
FIG. 2 illustrates an embodiment of a messaging system.

FIG. 2 illustrates an embodiment of a plurality of servers implementing various functions of a messaging service 140. It will be appreciated that different distributions of work and functions may be used in various embodiments of a messaging service 140. The messaging service 140 may comprise the messaging abuse prevention system 100 with the operations of the messaging abuse prevention system 100 comprising a portion of the overall operations of the messaging service 140.

The messaging service 140 may comprise a domain name front end 210. The domain name front end 210 may be assigned one or more domain names associated with the messaging service 140 in a domain name system (DNS). The domain name front end 210 may receive incoming connections and distribute the connections to servers providing various messaging services.

The messaging service 140 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging service 140 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 140 may comprise one or more offline storage servers 231. The one or more offline storage servers 231 may store messaging content for currently-offline messaging clients in hold for when the messaging clients reconnect.

The messaging service 140 may comprise one or more sessions servers 232. The one or more session servers 232 may maintain session state of connected messaging clients.

The messaging service 140 may comprise one or more presence servers 233. The one or more presence servers 233 may maintain presence information for the messaging service 140. Presence information may correspond to user-specific information indicating whether or not a given user has an online messaging client and is available for chatting, has an online messaging client but is currently away from it, does not have an online messaging client, and any other presence state.

The messaging service 140 may comprise one or more push storage servers 234. The one or more push storage servers 234 may cache push requests and transmit the push requests to messaging clients. Push requests may be used to wake messaging clients, to notify messaging clients that a messaging update is available, and to otherwise perform server-side-driven interactions with messaging clients.

The messaging service 140 may comprise one or more group servers 235. The one or more group servers 235 may maintain lists of groups, add users to groups, remove users from groups, and perform the reception, caching, and forwarding of group chat messages.

The messaging service 140 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 140 may comprise one or more last seen information servers 237. The one or more last seen information servers 237 may receive, store, and maintain information indicating the last seen location, status, messaging client, and other elements of a user's last seen connection to the messaging service 140.

The messaging service 140 may comprise one or more key servers 238. The one or more key servers may host public keys for public/private key encrypted communication.

The messaging service 140 may comprise one or more profile photo servers 239. The one or more profile photo servers 239 may store and make available for retrieval profile photos for the plurality of users of the messaging service 140.

The messaging service 140 may comprise one or more spam logging servers 240. The one or more spam logging servers 240 may log known and suspected spam (e.g., unwanted messages, particularly those of a promotional nature). The one or more spam logging servers 240 may be operative to analyze messages to determine whether they are spam and to perform punitive measures, in some embodiments, against suspected spammers (users that send spam messages).

The messaging service 140 may comprise one or more statistics servers 241. The one or more statistics servers may compile and store statistics information related to the operation of the messaging service 140 and the behavior of the users of the messaging service 140.

The messaging service 140 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access messaging abuse prevention system 100.

The messaging service 140 may comprise one or more chat activity monitoring servers 243. The one or more chat activity monitoring servers 243 may monitor the chats of users to determine unauthorized or discouraged behavior by the users of the messaging service 140. The one or more chat activity monitoring servers 243 may work in cooperation with the spam logging servers 240 and block list servers 236, with the one or more chat activity monitoring servers 243 identifying spam or other discouraged behavior and providing spam information to the spam logging servers 240 and blocking information, where appropriate to the block list servers 236.

The messaging service 140 may comprise one or more sync servers 244. The one or more sync servers 244 may sync the messaging system 240 with contact information from a messaging client, such as an address book on a mobile phone, to determine contacts for a user in the messaging service 140.

The messaging service 140 may comprise one or more multimedia servers 245. The one or more multimedia servers may store multimedia (e.g., images, video, audio) in transit between messaging clients, multimedia cached for offline endpoints, and may perform transcoding of multimedia.

The messaging service 140 may comprise one or more payment servers 246. The one or more payment servers 246 may process payments from users. The one or more payment servers 246 may connect to external third-party servers for the performance of payments.

The messaging service 140 may comprise one or more registration servers 247. The one or more registration servers 247 may register new users of the messaging service 140.

The messaging service 140 may comprise one or more voice relay servers 248. The one or more voice relay servers 248 may relay voice-over-internet-protocol (VoIP) voice communication between messaging clients for the performance of VoIP calls.

Figure 3A:
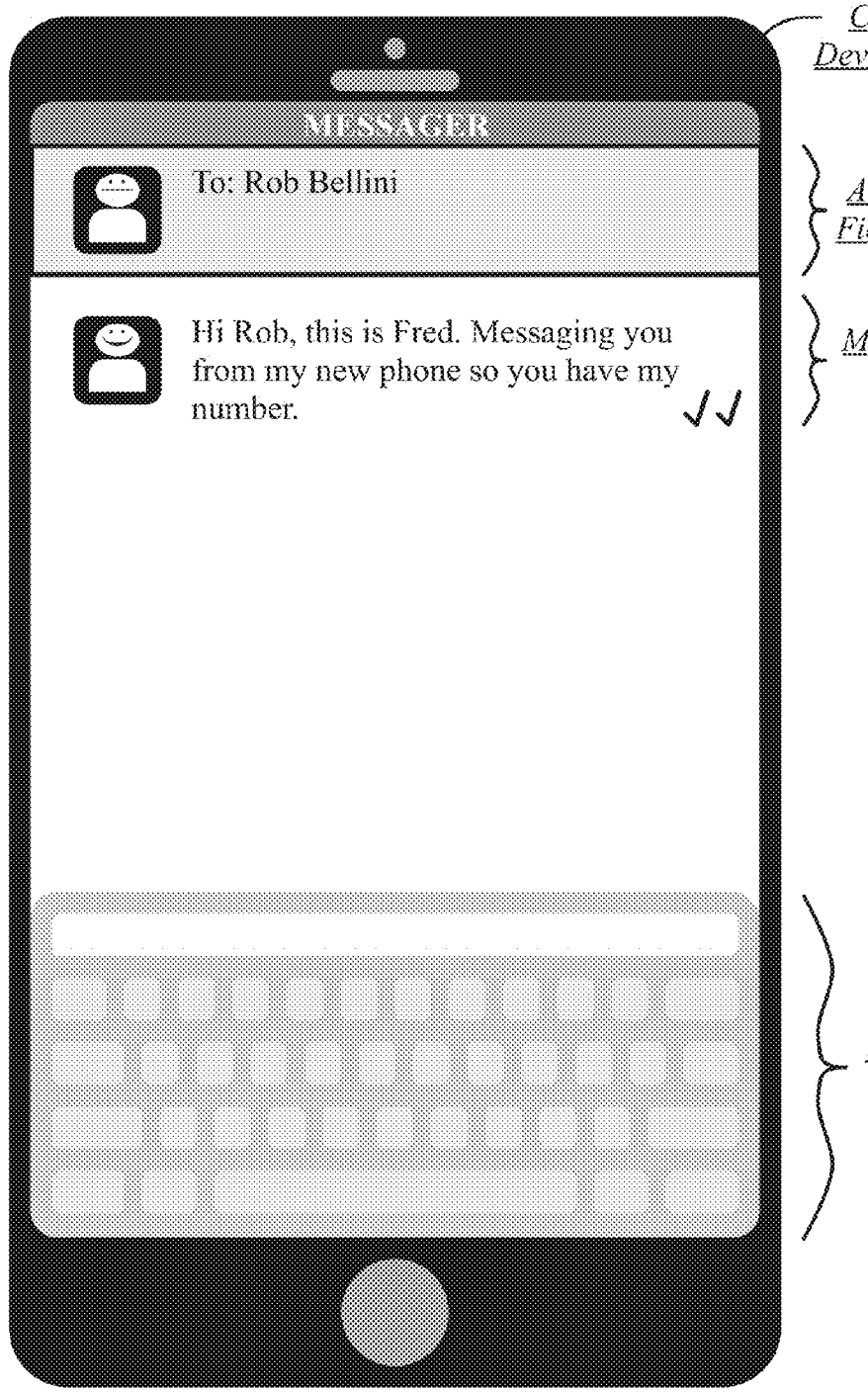
FIG. 3A illustrates an embodiment of a messaging client displaying a sent message.

FIG. 3A illustrates an embodiment of a messaging client on a suspect client device 120 displaying a sent message 310.

The user of suspect client device 120 may engage with a messaging client displaying user interface 300. The messaging client may use text controls 315 to allow the user to enter text, which may include both text commands controlling the behavior of the messaging client and text entry of text elements to include within messages sent via the messaging service 140. As illustrated, text controls 315 may comprise touch screen controls. However, in some embodiments a hardware keyboard, handwriting recognition system, or any technique for text entry may be used. The messaging client may include any control system, including touch screen controls for the selection of touch-screen user interface elements.

The user of suspect client device 120 may have entered a message 310 into the messaging client for sending to one or more users. The message 310 may be addressed via address field 305 to the one or more users. In the illustrated embodiment of FIG. 3A message 310 is addressed to a single user "Rob Bellini," but in other cases the message 310 may be addressed to a plurality of users of the messaging service 140. The display of message 310 may include associated reception and viewing indicator. A single icon, such as a check-mark icon, may indicate that the messaging service 140 has received the message 310 and has either transmitted the message 310 to destination messaging client or has queued the message 310 for delivery to the destination messaging client. A second icon, such as a second check-mark icon, may indicate that the use of the destination messaging client has viewed the message 310.

The example of FIG. 3A may correspond to a common scenario in which, due to a restriction of the messaging service 140 from examining the content of messages, the messaging service 140 may not be able to distinguish a legitimate social interaction from an abusive use of the messaging service 140. A new user to the messaging service 140—or a returning user with a new device, particularly where the messaging service 140 identifies users using their phone number—may send a large number (dozens or hundreds) of messages to their friends to inform them of their account or contact information (e.g., phone number). This may be difficult to distinguish from a spammer, or other abusive user, who registers a suspect client device 120 in order to spam users of the messaging service 140 with unwanted messages. This may particularly represent an example in which the reaction by the messaged users (e.g., blocking, responding, or adding to a contact list) clarifies whether the messaging interactions 110, as may include message 310, are unwanted or abusive.

Figure 3B:
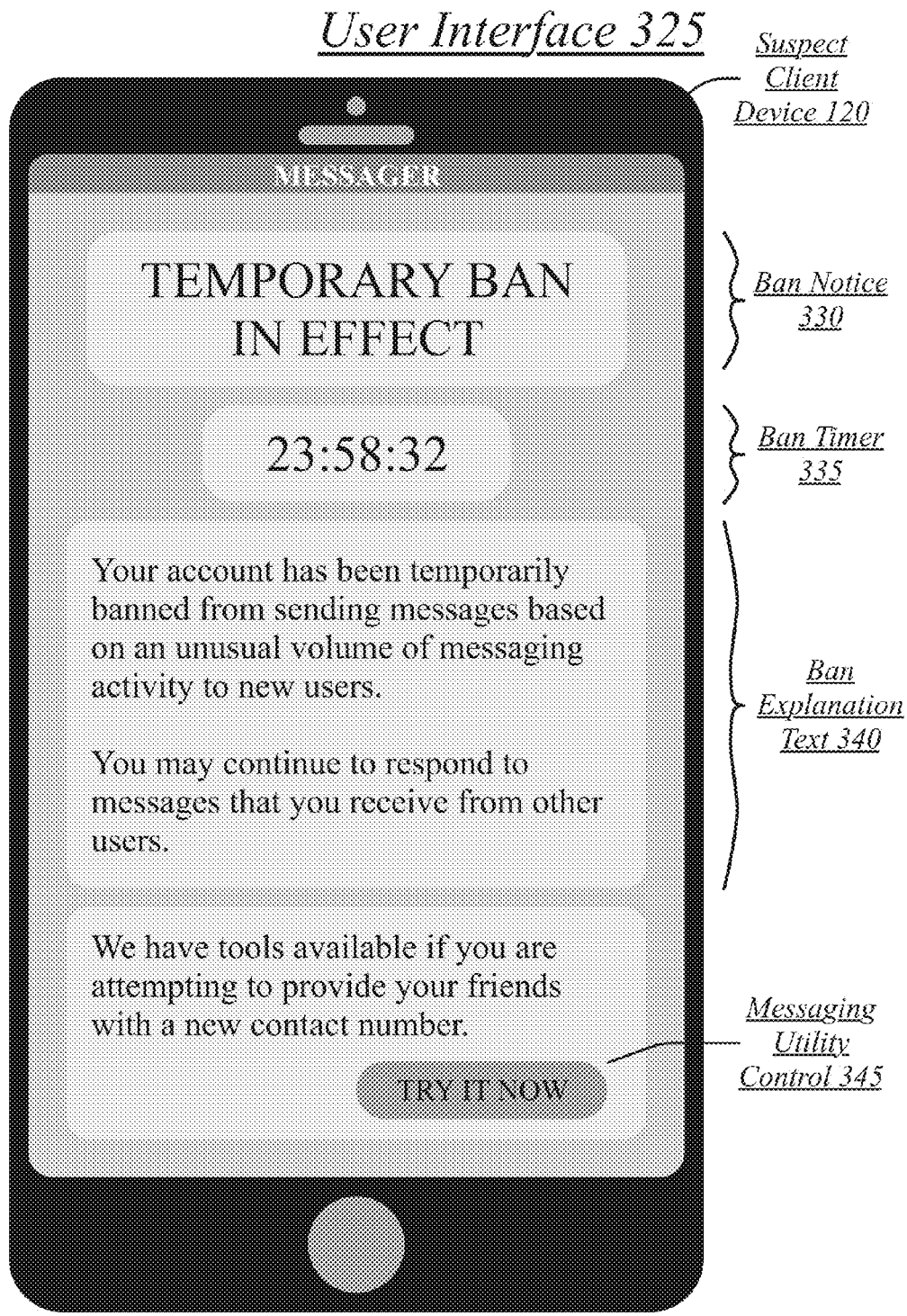
FIG. 3B illustrates an embodiment of a ban notice page.

FIG. 3B illustrates an embodiment of a ban notice page.

The illustrated embodiment of FIG. 3B may correspond to a messaging client on suspect client device 120 displaying a user interface 325 communicating a notice that the suspect client device 120 has been temporarily banned from using at least some aspects of the messaging service 140.

A ban notice page may include a ban notice 330 communicating that a ban has been enforced against the suspect client device 120. In the illustrated example of FIG. 3B this ban comprises a temporary ban, but in other cases may comprise a permanent ban.

A ban notice page may include a ban timer 335. The messaging client on suspect client device 120 may receive a ban duration for a temporary ban, a ban completion time for a temporary ban, or some other measure of when a ban may be expected to end barring any re-assignment of the ban duration or severity.

A ban notice page may include ban explanation text 340. Ban explanation text 340 may include an identification of the behavior that prompted the ban so as to inform a legitimate user of what behavior not to repeat in the future. By explaining the reason for a ban via the ban explanation text 340 the messaging service 140 may help the user of suspect client device 120 avoid repeating the suspect behavior and avoid future bans. This may be particularly helpful where the messaging service 140 uses escalating punishment—an increase in duration of temporary bans and/or an escalation from temporary bans to a permanent ban for repeat offenses. In some embodiments, the ban explanation text may not be displayed on the ban notice page and may instead be accessed through an explanation control on the ban notice page as may be described by a "learn more" label. Ban explanation text and/or the ban notice page may be localized to the suspect client device 120, such as through a translation into a local language of the geographic region of the suspect client device 120 or a preferred language specified by the user of the messaging client of the suspect client device 120.

A ban notice page may include messaging utility information and an associated messaging utility control 345. Messaging utility information may associate a particular reason for a ban—as explained by ban explanation text 340—with an alternative method of performing legitimate activity that may have resulted in the user of suspect client device 120. In the illustrated embodiment of FIG. 3B this corresponds to a messaging utility control 345 empowering a user that messaged a significant plurality of users, none or few of which had the suspect user as part of their contact list, to legitimately inform them of their new contact information. However, in various situation various other messaging utilities may be associated with various reasons for a ban having been applied. A "significant plurality of users" may correspond to a plurality of users the number of which exceeds a predefined threshold, which may be manually defined (such as by an administrator of the messaging service 140) or automatically defined in relation to the behavior of other users of the messaging service 140.

The messaging utility control 345 may empower a user to access communication tools distinct from the general-purpose messaging of the messaging service 140 to perform specific communication tasks such as notifying friends of new contact information such as a user account or phone number. In some embodiments, a messaging utility control 345 may use a social-networking service to communicate outside the normal channels of the messaging service 140. The messaging utility control 345 may empower the user of the messaging client to link the messaging client to a social-networking service and/or to use a linked social-networking service user account to transmit specific types of communication to friends associated with the user on the social-networking service and thereby avoid being flagged as possibly performing unwanted behavior on the messaging service 140. For example, a social-networking service may allow a user to send friends a notification that the user's contact information has changed and that their contact listing for the user should be updated. In some embodiments, a local application for the social-networking service may be able to, with a receiving user's permission, update the contact information for the user in the receiving user's address book or contact list and thereby contact the user at their new account or device.

It will be appreciated that a ban notice page may include additional information, features, and/or controls in addition to those illustrated in user interface 325. It will be appreciated that a ban notice page may not include every element illustrated in the example embodiment of user interface 325.

In some cases, an attempt to access the messaging service 140 using a banned client device 120 may result in a login failure. A login failure may result in an error code being return to the client device 120. Some error codes may reflect non-ban errors, such as a wrong-password error. Other error codes may comprise a punishment criterion identifier identifying the reason for a ban and empowering the user of the banned client device 120 to request the ban notice page explaining the ban.

An error code corresponding to a ban may inform the messaging client of a suggested delay to re-check the messaging service 140 to determine whether the user is yet allowed to resume use of the messaging service 140. In some cases the delay may be set to the remaining length of a temporary ban. In some cases the delay may be set to be shorter than the remaining length of a temporary ban to empower the messaging client to discover if a temporary ban has been lifted, such as due to a re-analysis of the suspect messaging interactions 110 by the messaging service 140. As such, the client device 120 may be configured with two timers. A first timer may correspond to a remaining length of the temporary ban, which first timer may be presented to the user of the client device 120 to inform the user as to the remaining length of the temporary ban. The second timer may correspond to the remaining time in the re-check delay, which may be used internally by the messaging client 420 to determine when to re-check whether the user may resume use of the messaging service 140.

Figure 4:
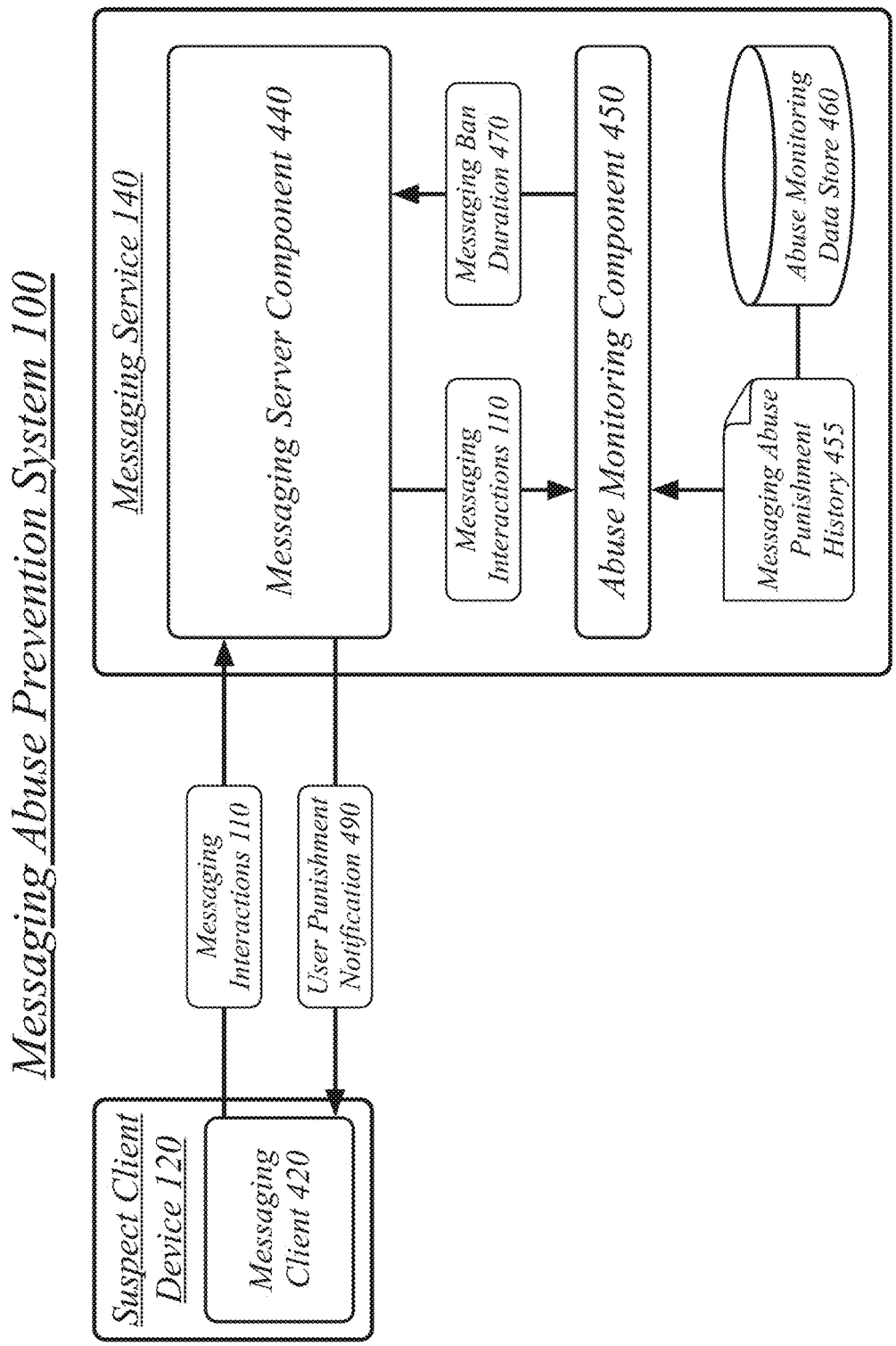
FIG. 4 illustrates an embodiment of a messaging service imposing a temporary ban.

FIG. 4 illustrates an embodiment of a messaging service 140 imposing a temporary ban.

A messaging service 140 may comprise a messaging server component 440. The messaging server component 440 may correspond to one of the chat servers 215 described with reference to FIG. 2.

A messaging service 140 may comprise an abuse monitoring component 450. The abuse monitoring component 450 may correspond to one of the chat activity monitoring servers 243 described with reference to FIG. 2.

The messaging server component 440 may receive one or more messaging interactions 110 from a messaging client on a suspect client device 120 at a messaging service 140, the messaging client associated with a user account for the messaging service 140. The abuse monitoring component 450 may analyze the one or more messaging interactions 110 based on a plurality of messaging abuse criteria to determine that the user account meets a messaging abuse threshold.

The abuse monitoring component 450 may retrieve a messaging abuse punishment history for the user account and determine a messaging ban duration based on the messaging abuse punishment history and the determination that the user account meets the messaging abuse threshold. The messaging server component 440 may impose a restriction on the user account from transmitting messaging using the messaging service 140 for a duration based on a messaging ban duration.

The messaging service 140 may use escalating temporary ban length according to a messaging ban length sequence in which each successive messaging ban is longer than the last. The abuse monitoring component 450 may determine that the messaging abuse punishment history indicates that the user account was subjected to a previous messaging ban duration. The abuse monitoring component 450 may determine the messaging ban duration as a longer duration than the previous messaging ban duration according to the messaging ban length sequence. The messaging ban duration and the previous messaging ban duration may comprise stages of the escalating messaging ban duration sequence. Where the messaging abuse punishment history indicates that the user has not received a previous ban and/or any previous punishment the user may be subject to a minimal-length ban that corresponds to the initial step in the messaging ban length sequence.

The messaging server component 440 may receive a messaging interaction attempt from the messaging client on the suspect client device 120 at the messaging service 140. The messaging interaction may comprise, for example, an attempt to send a message to a user of the messaging service 140. The messaging server component 440 may retrieve a user punishment education page, such as the ban notice page described with reference to FIGS. 3A and 3B, based on a messaging abuse criterion used in determining that the user account meets the messaging abuse threshold. The messaging server component 440 may transmit the user punishment education page to the messaging client in response to the messaging interaction attempt.

In some embodiments, ban information for the messaging client 420 and the ban notice page may be sent to the messaging client 420 only during login attempts. As such, messaging clients may be forcibly disconnected from the messaging service 140 when banned to force a re-login attempt and therefore a communication of the ban to the messaging client 420 and the user of the messaging client 420.

To simplify client logic, the messaging server component 440 may simply disconnect the messaging client 420 from the messaging service 140 based on the imposing of the restriction on the user account. This may correspond to forcibly disconnecting (i.e., kicking) the messaging client 420 from the messaging service 140 such that the messaging client 420 may only resume use of the messaging service 140 after reconnecting to the messaging service 140 and successfully re-logging in. The messaging client 420 may be configured to automatically attempt to re-login to the messaging service 140 when disconnected from the messaging service 140.

When the messaging client 420 attempts to re-login (automatically or as manually requested by the user), the messaging server component 440 may receive a login attempt from the messaging client 420 on the client device 120 at the messaging service 140. The messaging server component 440 may determine that the messaging client 420 has been temporarily banned and in response retrieve the user punishment education page based on the messaging abuse criterion used in determining that the user account meets the messaging abuse threshold and transmit the user punishment education page to the messaging client 420 in response to the login attempt. This may serve to simplify the client logic by only ever notifying the messaging client 420 that it has been temporarily banned during a login attempt, thereby freeing the messaging client 420 from having to transition to a ban-notification state from any state of activity other than not being logged in or being in the process of attempting to log in.

The messaging service 140 may inform the messaging client of the criterion relied upon to ban the user of the suspect client device 120. The criterion may be communicated using a user punishment criterion identifier defined by the messaging service 140 and distributed to messaging clients via messaging client update procedures. The messaging server component 440 may transmit a user punishment criterion identifier to the messaging client in response to the messaging interaction attempt and receive a user punishment education page request from the messaging client, the user punishment education page request comprising the user punishment criterion identifier. The messaging server component 440 may transmit the user punishment education page to the messaging client in response to the user punishment education page request. The user punishment education page may comprise a messaging utility control 345 operative to duplicate at least a portion of the one or more messaging interactions 110 using messaging interaction techniques that avoid punishment by the messaging service 140.

The abuse monitoring component 450 may determine that the messaging abuse punishment history for the user account indicates that the user account has received a temporary ban threshold number of temporary bans. The abuse monitoring component 450 may assign the messaging ban duration as a permanent ban based on the determination that the messaging abuse punishment history for the user account indicates that the user account has received the temporary ban threshold number of temporary bans. For example, a temporary ban sequence may comprise an escalation from a twenty-four-hour ban to a forty-eight-hour ban to a one-week ban. A user account that has already received each of these three threshold of a temporary ban sequence may then be escalated to a permanent ban. In general, a user account may be escalated to a permanent ban when a temporary ban sequence has been exhausted for the user account.

In some embodiments, a user may be empowered to use limited aspects of the messaging service 140 even while subject to a temporary ban. In some cases, a restriction on the user account may still permit the user account to transmit messages to destination user accounts which have the user account on their contact list. Therefore, the messaging server component 440 may receive a message transmission from the messaging client on the suspect client device 120, determine that the messaging transmission attempt is addressed to a destination user account with the user account on the contact list for the destination user account, and transmit the message transmission to a destination messaging client for the destination user account in response to determining that the user account is on the contact list for the destination user account. In some cases, a restriction on the user account may permit the user to respond to messages transmitted to the user of the suspect client device 120. In these and other cases, a restriction on the user account may permit the user to receive messages.

In some embodiments, a user may be assigned a reputation score by the messaging service 140. The reputation score may reflect an extent to which the user has used the service appropriately and refrained from abusive or otherwise unwanted behavior. A user with a higher reputation score has been evaluated to have used the service appropriately. A user with a lower reputation score has been evaluated to have not used the service appropriately or has not yet established a reputation with the service, and as such a low reputation score may be the default starting score for a user. A user may start with a low, or zero, reputation score and their reputation score may be increased as they prove themselves welcome users of the messaging service 140.

A user's reputation score may be increased for each response to one of their sent messages, for each distinct receiving user that responds to one of their sent messages, or for each distinct user that adds the user to their contact list. A user's reputation score may be derived from the ratio between how many of the user's outgoing messages are responses to incoming messages as compared to how many of the user's outgoing messages are to users that have never sent a message to the user. Any other criteria related to the user's behavior on the messaging service 140 and how other users respond to the user's behavior on the messaging service 140 may be used in determining a user's reputation score. Various combinations of criteria may be used in different embodiments.

In some cases, more complex analysis of a user may be used, such as detecting whether the users contacted by the suspect user know each other. A user may be allowed a higher rate of messaging and assigned a higher reputation score when their messaging interactions 110 are directed to users that are established as knowing each other (e.g., have each other on their contact list, message each other), suggesting that the suspect user is engaging with an established social group. In general, the pattern of a user's messaging may be analyzed based on various metrics and/or based on pattern-matching to known-good users to determine whether the pattern corresponds to approved use of the messaging service 140.

In some embodiments, a user's reputation score may include information, such as a realness score, from an associated social-networking service account for the user. A realness score for a user may reflect an evaluation by the social-networking service as to whether the user information of a user account in the social-networking service corresponds to a real human being. This user information may include the contact information for the user in the messaging service 140 and the realness score may therefore reflect whether the user of the messaging service 140 is authentically part of a user's online presence. As such, a user's reputation score may be higher where the user's associated realness score is higher and lower where the user's associated realness score is lower.

The threshold used to evaluate the messaging abuse criteria and a user's reputation may vary according to various factors. Client devices operating within geographic regions containing an unusual percentage of spammers may be subject to a lower threshold. Client devices transmitting to outside their geographic region may be subject to a lower threshold. Client devices transmitting to a geographic region that does not match the geographic region dominant within their contact list may be subject to a lower threshold.

Some criteria may be rebalanced or not used within particular geographic regions. For example, some geographic regions, such as Brazil, have a culture more prone to the messaging of people who does not have the messaging user in their contact list and, as such, may require a greater number of non-contact-list messages to be penalized.

A user's reputation score may be used to gate access to various features of the messaging service 140 such as to limit a user's use of the messaging service 140. In some embodiments, a maximum messaging rate for the user may be defined based on the user's reputation score, with a higher reputation score corresponding to a higher allowed rate of message sending and a lower reputation score corresponding to a lower allowed rate of message sending. Various threshold of reputation score may be assigned a particular maximum allowed rate of message sending with a user permitted a maximum allowed rate of message sending equal to the highest threshold that they have met or surpassed. A maximum allowed rate of message sending may be defined according to various different time periods, such as a maximum number of sent messages per hour or per day. In some cases, a particular threshold may be associated with a plurality of maximum allowed rates of message sending, such as both a maximum number of sent messages per hour and a maximum number of sent messages per day. In some cases, a maximum allowed rate of message sending may only be applied to messages sent to users that do not have the sending user in their contact list and/or may not count messages sent in response to messages received by the user.

In some embodiments, users may only be rate limited based on their reputation score if they have received a punishment from the messaging service 140 such as a temporary ban. The rate limiting may apply even after the completion of the duration of the temporary ban and thereby serve as a probationary limitation that continues onward after the temporary ban and limits the user's behavior until they have established a sufficient reputation. In some cases, the highest threshold of reputation score may allow a user unlimited access to the messaging service 140 (except where limited by a temporary ban, permanent ban, blocking, etc.). In other embodiments, all users may be start out being rate limited based on their reputation score with rate limiting being the default for new users to the messaging service 140. In some embodiments, rate limiting may only be used during the duration of a temporary ban, with the temporary ban therefore being a partial ban allowing limited (e.g., rate-limited) messaging.

In some embodiments, negative behavior (e.g., spamming, harassment) or the infliction of punishments (e.g., temporary bans or other limitations on use of the service) may result in a reduction of a user's reputation score. As such, a user that has primarily or exclusively engaged in negative behavior may have a negative reputation score. Each infliction of a punishment may result in a set reduction in a user's reputation score. A user's reputation score may then be used to determine, at least in part, the severity of a user's future punishment, if any. A user with a sufficiently negative reputation score (i.e., less than a threshold) may receive a longer ban, a ban of a duration longer than the duration that would have been applied had the user not had a sufficiently negative reputation score. Similarly, a user with a sufficiently negative reputation score may receive a permanent ban instead of a temporary ban. In some embodiments, only negative reputation modifications may be applied, such that a user has either a zero reputation score (they have never been subject to punishment) or a negative reputation score (they have been subject to punishment).

A plurality of messages sent by a user may be compared to each other in order to determine whether the messages are indicative of unwanted behavior. A user sending an identical message to a large number of users may indicate that the message is unwanted spam. Even where the messaging service 140 uses end-to-end encryption a message checksum may be submitted with a message as part of a message package used to send the message. Where some or all of a plurality of messaging interactions 110 have the same checksum this may be indicative of spamming behavior and result in a ban by the messaging service 140. Sending links (e.g., uniform resource locators (URLs)) may be indicative of unwanted behavior, particularly the sending of the same link to a large number of users. As such, a checksum of any URL sent as part of a message may be sent in addition or as an alternative to the message checksum. Where some or all of a plurality of messaging interactions 110 have the same URL checksum this may be indicative of spamming behavior and result in a ban by the messaging service 140. The URL checksum threshold may be set lower than the messaging checksum threshold as the latter may be used, for example, with a new user notifying friends of their new phone while the former would not. However, where a custom (e.g., third-party) messaging client is used to submit a message, the custom messaging client may be designed to produce an incorrect checksum to avoid spam detection. As such, in some embodiments the checksum may not be received from the messaging client 420 and may instead be generated by the messaging service 140. However, where the messaging service 140 uses end-to-end encryption, or otherwise does not have access to the message content, it may be unable to calculate a checksum of the message content. As such, in some embodiments the use of checksums for spam detection may not be used.

Figure 5:
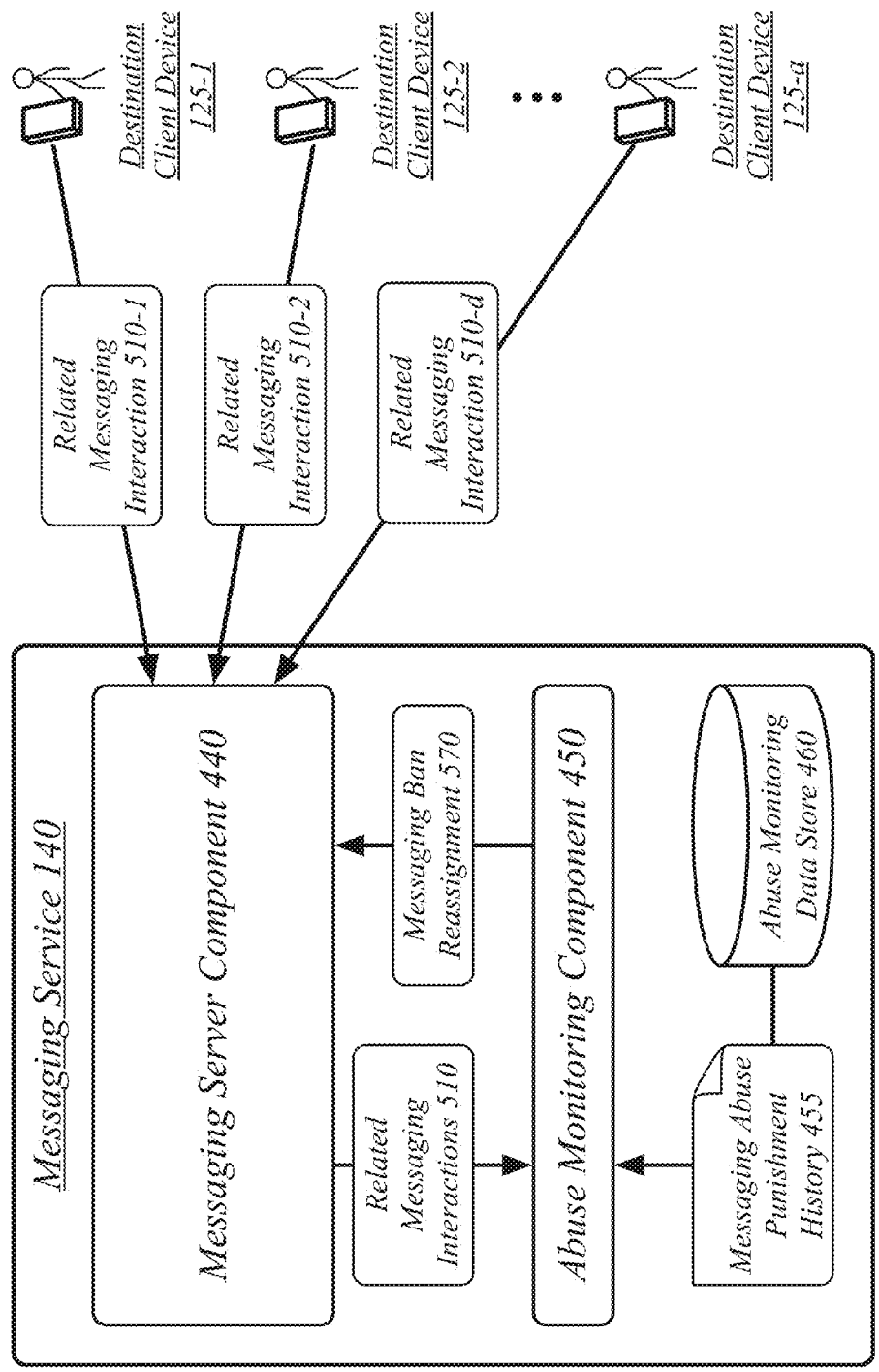
FIG. 5 illustrates an embodiment of a messaging service re-analyzing a temporary ban.

FIG. 5 illustrates an embodiment of a messaging service 140 re-analyzing a temporary ban.

The messaging server component 440 may receive one or more related messaging interactions 510 at the messaging service 140 from the destination client devices 125, the related messaging interactions 510 related to the one or more messaging interactions 110 received from the messaging client on the suspect client device 120. The abuse monitoring component 450 may re-analyze the one or more messaging interactions 110 based on the plurality of messaging abuse criteria to determine that the user account no longer meets the messaging abuse threshold and lift the restriction on the user account from transmitting messaging using the messaging service 140 in response to the re-analyzing of the one or more messaging interactions 110. The re-analyzing may be dependent on the evaluation of the messaging interactions 110 changing in light of the related messaging interactions 510.

Re-analyzing the one or more messaging interactions 110 based on the plurality of messaging abuse criteria to determine that the user account no longer meets the messaging abuse threshold may be in response to the one or more related messaging interactions 510 comprising one or more destination user accounts of the one or more messaging interactions 110 adding the user account as a contact with the messaging service 140.

In some cases, re-analysis of the messaging interactions 110 may indicate that the user of the suspect client device 120 warrants a more serious messaging punishment, such as a permanent ban on using the messaging service 140. The messaging server component 440 may receive one or more related messaging interactions 510 at the messaging service 140, the related messaging interactions 510 related to the one or more messaging interactions 110 received from the messaging client on the suspect client device 120. The abuse monitoring component 450 may re-analyze the one or more messaging interactions 110 based on the plurality of messaging abuse criteria to determine that the user account meets a higher messaging abuse threshold and increase the restriction on the user account in response to the re-analyzing of the one or more messaging interactions 110. In some cases, this increased restriction may comprise a permanent ban.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive one or more messaging interactions from a messaging client on a client device at a messaging service, the messaging client associated with a user account for the messaging service at block 602.

The logic flow 600 may analyze the one or more messaging interactions based on a plurality of messaging abuse criteria to determine that the user account meets a messaging abuse threshold at block 604.

The logic flow 600 may retrieve a messaging abuse punishment history for the user account at block 606.

The logic flow 600 may determine a messaging ban duration based on the messaging abuse punishment history and the determination that the user account meets the messaging abuse threshold at block 608.

The logic flow 600 may impose a restriction on the user account from transmitting messaging using the messaging service for a duration based on the messaging ban duration at block 610.

The embodiments are not limited to this example.

Figure 7:
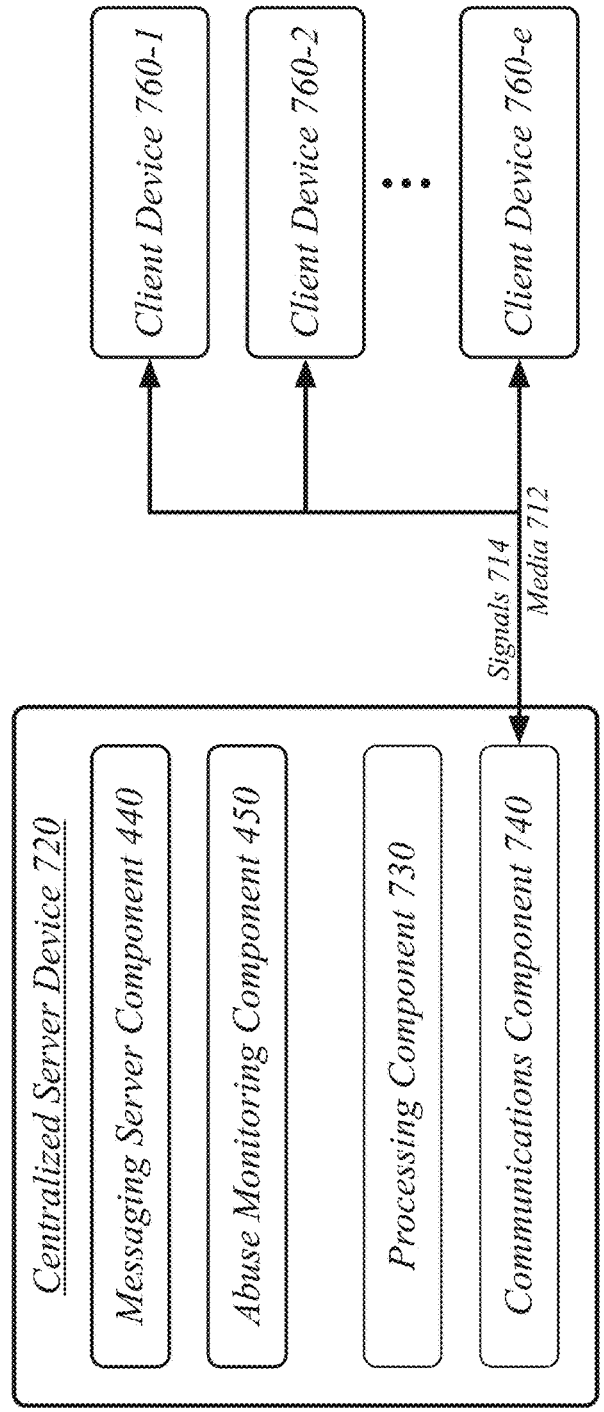
FIG. 7 illustrates an embodiment of a centralized system for the system of FIG. 1.

FIG. 7 illustrates a block diagram of a centralized system 700. The centralized system 700 may implement some or all of the structure and/or operations for the messaging abuse prevention system 100 in a single computing entity, such as entirely within a single centralized server device 720.

The centralized server device 720 may comprise any electronic device capable of receiving, processing, and sending information for the messaging abuse prevention system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the messaging abuse prevention system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the messaging abuse prevention system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may implement both the messaging server component 440 and the abuse monitoring component 450. The centralized server device 720 may communicate with the a plurality of client devices 760, such as may include suspect client device 120 and destination client devices 125, over a communications media 712 using communications signals 714 via the communications component 740.

Figure 8:
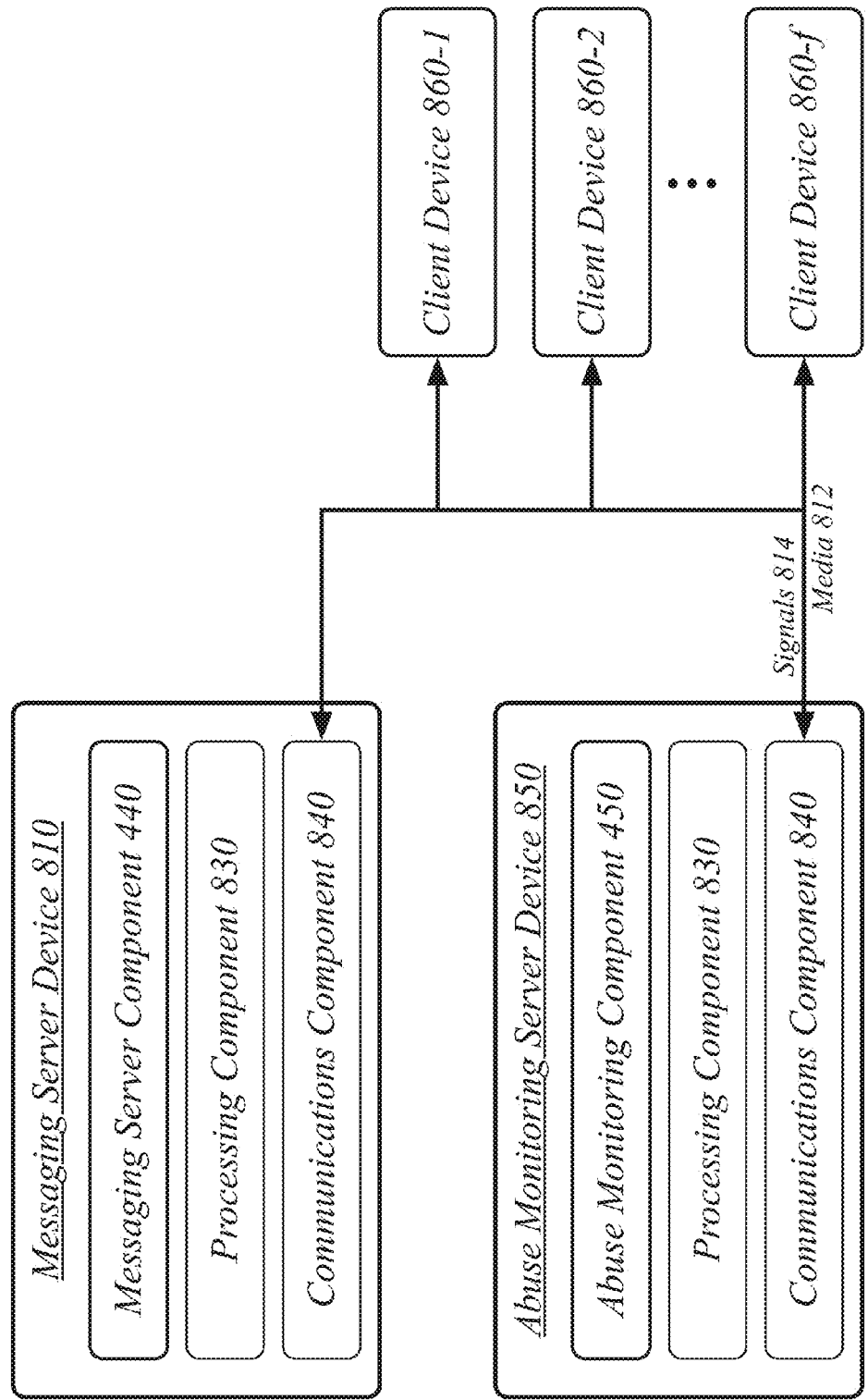
FIG. 8 illustrates an embodiment of a distributed system for the system of FIG. 1.

FIG. 8 illustrates a block diagram of a distributed system 800. The distributed system 800 may distribute portions of the structure and/or operations for the messaging abuse prevention system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a messaging server device 810 and an abuse monitoring server device 850. In general, the messaging server device 810 and the abuse monitoring server device 850 may be the same or similar to the centralized server device 720 as described with reference to FIG. 7. For instance, the messaging server device 810 and the abuse monitoring server device 850 may each comprise a processing component 830 and a communications component 840 which are the same or similar to the processing component 730 and the communications component 740, respectively, as described with reference to FIG. 7. In another example, the devices 810, 850 may communicate over a communications media 812 using communications signals 814 via the communications components 840.

The messaging server device 810 may comprise or employ one or more client programs that operate to perform various methodologies in accordance with the described embodiments. In one embodiment, for example, the messaging server device 710 may implement the messaging server component 440.

The abuse monitoring server device 850 may comprise or employ one or more server programs that operate to perform various methodologies in accordance with the described embodiments. In one embodiment, for example, the abuse monitoring server device 850 may implement the abuse monitoring component 450.

The messaging server device 810 and the abuse monitoring server device 850 may communicate with the a plurality of client devices 860, such as may include suspect client device 120 and destination client devices 125, over the communications media 812 using communications signals 814 via the communications components 840.

Figure 9:
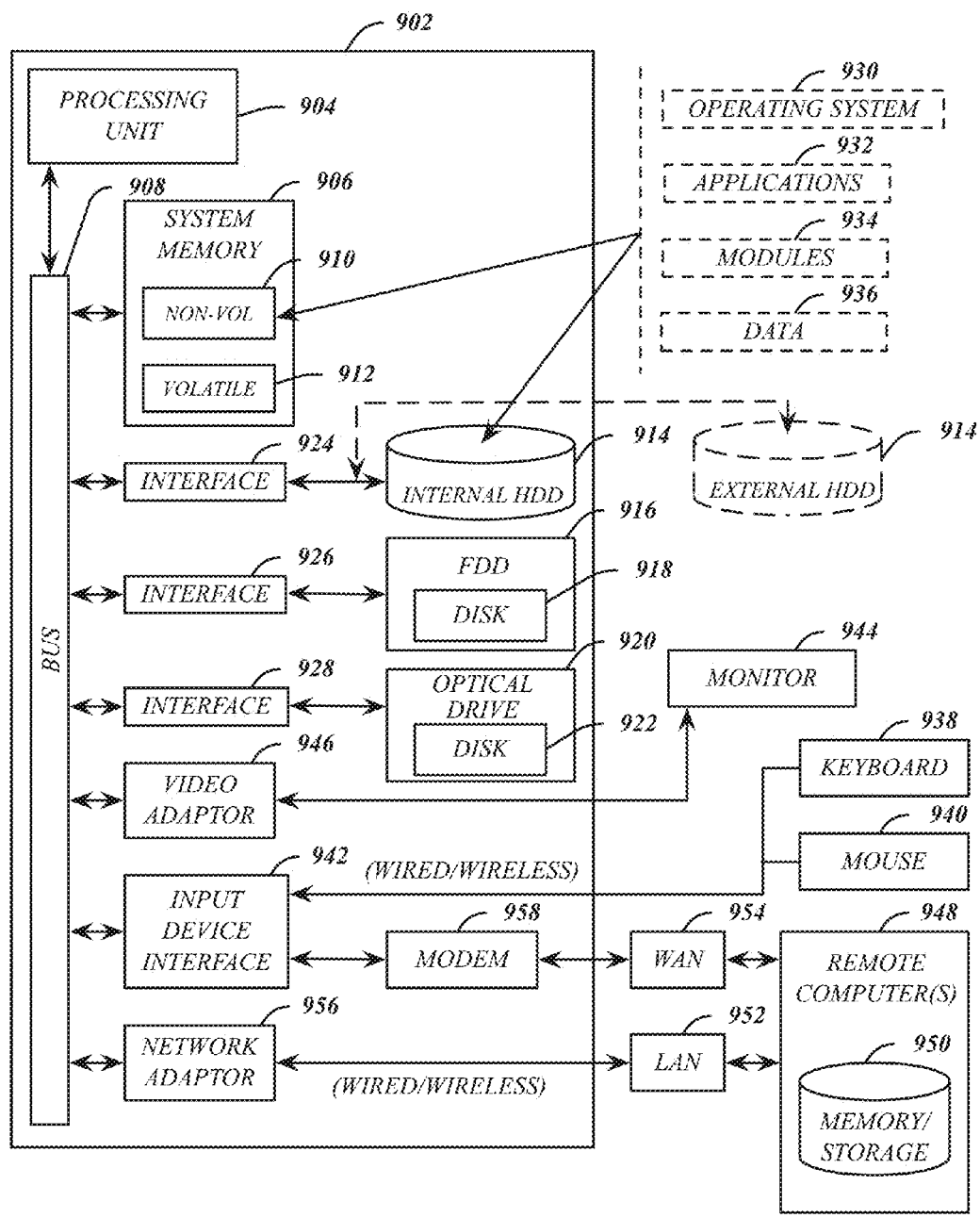
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the messaging abuse prevention system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
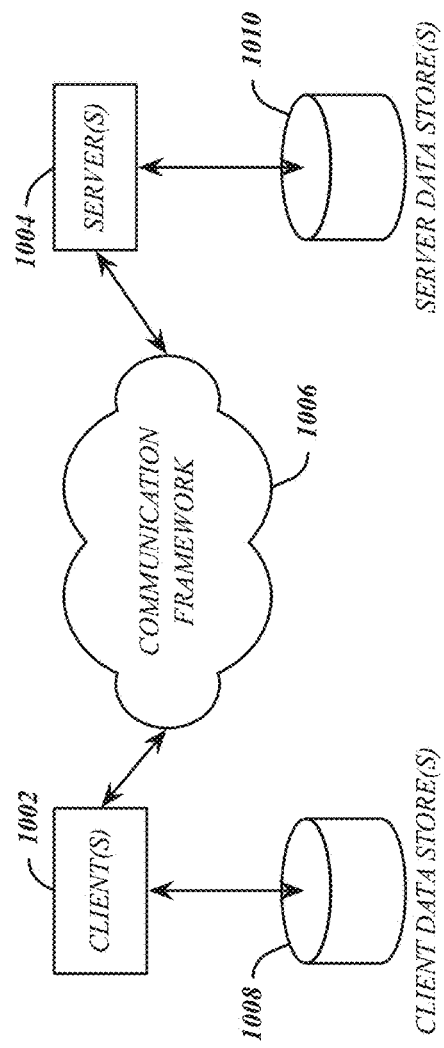
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 910. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
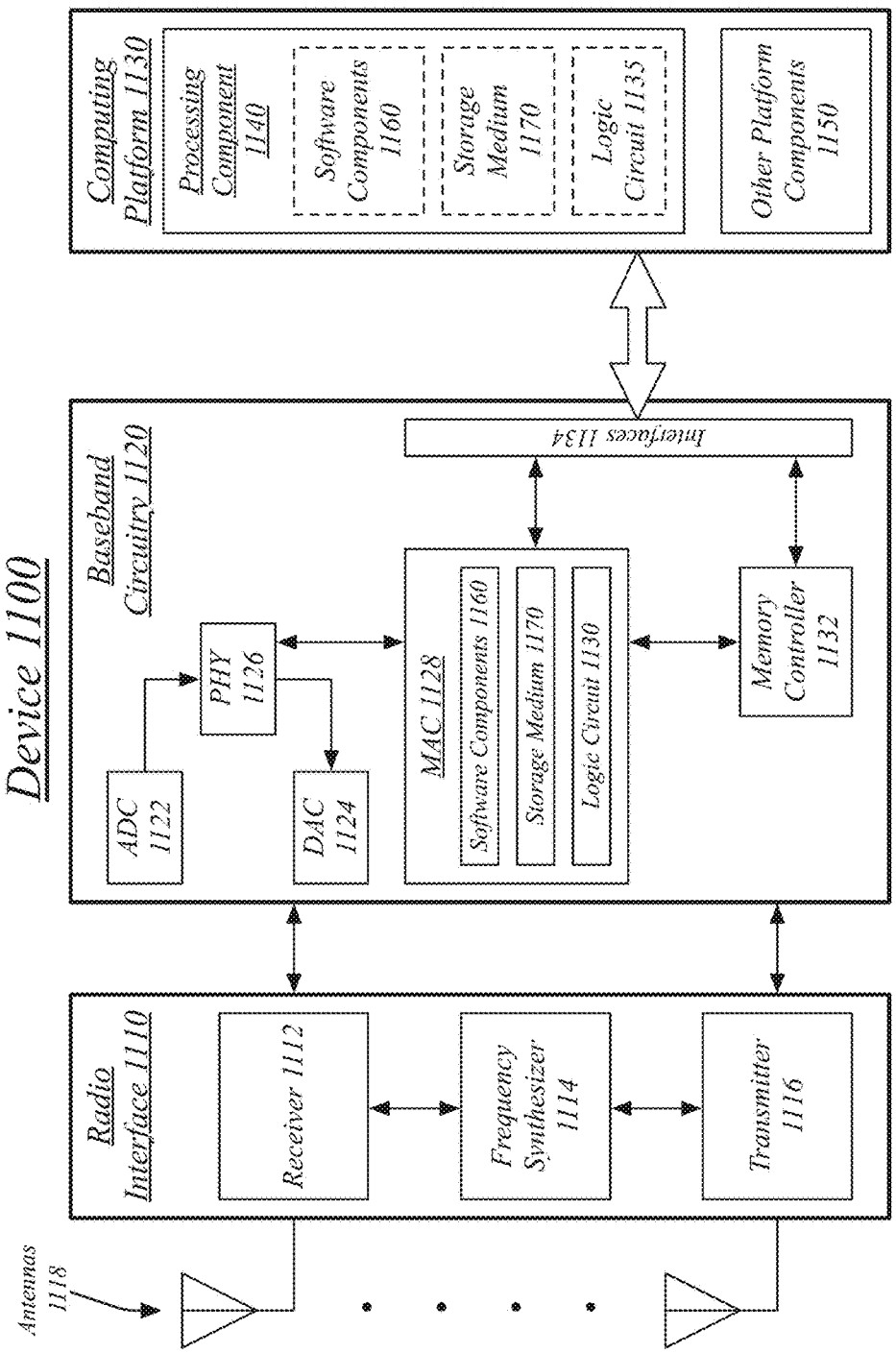
FIG. 11 illustrates an embodiment of a radio device architecture.

FIG. 11 illustrates an embodiment of a device 1100 for use in a multicarrier OFDM system, such as the messaging abuse prevention system 100. Device 1100 may implement, for example, software components 1160 as described with reference to messaging abuse prevention system 100 and/or a logic circuit 1135. The logic circuit 1135 may include physical circuits to perform operations described for the messaging abuse prevention system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the messaging abuse prevention system 100 and/or logic circuit 1135 in a single computing entity, such as entirely within a single device. Alternatively, the device 1100 may distribute portions of the structure and/or operations for the messaging abuse prevention system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the messaging abuse prevention system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving one or more messaging interactions from a messaging client on a client device at a messaging service, the messaging client associated with a user account for the messaging service; analyzing the one or more messaging interactions based on a plurality of messaging abuse criteria to determine that the user account meets a messaging abuse threshold; retrieving a messaging abuse punishment history for the user account; determining a messaging ban duration based on the messaging abuse punishment history and the determination that the user account meets the messaging abuse threshold; and imposing a restriction on the user account from transmitting messaging using the messaging service for a duration based on the messaging ban duration.

A computer-implemented method may further comprise determining that the messaging abuse punishment history indicates that the user account was subjected to a previous messaging ban duration; and determining the messaging ban duration as a longer duration than the previous messaging ban duration.

A computer-implemented method may further comprise the messaging ban duration and the previous messaging ban duration comprising stages of an escalating messaging ban duration sequence.

A computer-implemented method may further comprise receiving a messaging interaction attempt from the messaging client on the client device at the messaging service; retrieving a user punishment education page based on a messaging abuse criterion used in determining that the user account meets the messaging abuse threshold; transmitting the user punishment education page to the messaging client in response to the messaging interaction attempt.

A computer-implemented method may further comprise disconnecting the messaging client from the messaging service based on the imposing of the restriction on the user account; receiving a login attempt from the messaging client on the client device at the messaging service; retrieving a user punishment education page based on a messaging abuse criterion used in determining that the user account meets the messaging abuse threshold; and transmitting the user punishment education page to the messaging client in response to the login attempt.

A computer-implemented method may further comprise transmitting a user punishment criterion identifier to the messaging client in response to the messaging interaction attempt; receiving a user punishment education page request from the messaging client, the user punishment education page request comprising the user punishment criterion identifier; and transmitting the user punishment education page to the messaging client in response to the user punishment education page request.

A computer-implemented method may further comprise the user punishment education page comprising a messaging utility control operative to duplicate at least a portion of the one or more messaging interactions using messaging interaction techniques that avoid punishment by the messaging service.

A computer-implemented method may further comprise receiving one or more related messaging interactions at the messaging service, the related messaging interactions related to the one or more messaging interactions received from the messaging client; re-analyzing the one or more messaging interactions based on the plurality of messaging abuse criteria to determine that the user account no longer meets the messaging abuse threshold; and lifting the restriction on the user account from transmitting messaging using the messaging service in response to the re-analyzing of the one or more messaging interactions.

A computer-implemented method may further comprise wherein re-analyzing the one or more messaging interactions based on the plurality of messaging abuse criteria to determine that the user account no longer meets the messaging abuse threshold is in response to the one or more related messaging interactions comprising one or more destination user accounts of the one or more messaging interactions adding the user account as a contact with the messaging service.

A computer-implemented method may further comprise receiving one or more related messaging interactions at the messaging service, the related messaging interactions related to the one or more messaging interactions received from the messaging client; re-analyzing the one or more messaging interactions based on the plurality of messaging abuse criteria to determine that the user account meets a higher messaging abuse threshold; and increasing the restriction on the user account in response to the re-analyzing of the one or more messaging interactions.

A computer-implemented method may further comprise wherein the increased restriction comprises a permanent ban.

A computer-implemented method may further comprise determining that the messaging abuse punishment history for the user account indicates that the user account has received a temporary ban threshold number of temporary bans; and assigning the messaging ban duration as a permanent ban based on the determination that the messaging abuse punishment history for the user account indicates that the user account has received the temporary ban threshold number of temporary bans.

A computer-implemented method may further comprise the restriction on the user account permitting the user account to transmit messages to destination user accounts with the user account on the contact lists for the destination user accounts, further comprising: receiving a message transmission from the messaging client; determining that the messaging transmission attempt is addressed to a destination user account with the user account on the contact list for the destination user account; and transmitting the message transmission to a destination messaging client for the destination user account in response to determining that the user account is on the contact list for the destination user account.

An apparatus may comprise a processor circuit on a device; a messaging server component operative on the processor circuit to receive one or more messaging interactions from a messaging client on a client device at a messaging service, the messaging client associated with a user account for the messaging service; and impose a restriction on the user account from transmitting messaging using the messaging service for a duration based on a messaging ban duration; an abuse monitoring component operative to analyze the one or more messaging interactions based on a plurality of messaging abuse criteria to determine that the user account meets a messaging abuse threshold; retrieve a messaging abuse punishment history for the user account; and determine a messaging ban duration based on the messaging abuse punishment history and the determination that the user account meets the messaging abuse threshold. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving one or more messaging interactions from a messaging client on a client device at a messaging service, the messaging client associated with a user account for the messaging service;
   analyzing the one or more messaging interactions based on a plurality of messaging abuse criteria to determine that the user account meets a messaging abuse threshold;
   retrieving a messaging abuse punishment history for the user account, wherein the messaging abuse punishment history includes previous punishments imposed on the user account for previous messaging abuses;
   determining a messaging ban duration based on the messaging abuse punishment history and the determination that the user account meets the messaging abuse threshold; and
   imposing a restriction on the user account from transmitting messaging using the messaging service for a duration based on the messaging ban duration.

2. The method of claim 1, comprising:
   determining that the messaging abuse punishment history indicates that the user account was subjected to a previous messaging ban duration; and
   determining the messaging ban duration as a longer duration than the previous messaging ban duration.

3. The method of claim 2, the messaging ban duration and the previous messaging ban duration comprising stages of an escalating messaging ban duration sequence.

4. The method of claim 1, comprising:
   disconnecting the messaging client from the messaging service based on the imposing of the restriction on the user account;
   receiving a login attempt from the messaging client on the client device at the messaging service;
   retrieving a user punishment education page based on a messaging abuse criterion used in determining that the user account meets the messaging abuse threshold; and
   transmitting the user punishment education page to the messaging client in response to the login attempt.

5. The method of claim 4, the user punishment education page comprising a messaging utility control operative to duplicate at least a portion of the one or more messaging interactions using messaging interaction techniques that avoid punishment by the messaging service.

6. The method of claim 1, further comprising;
   receiving one or more related messaging interactions at the messaging service, the related messaging interactions related to the one or more messaging interactions received from the messaging client;
   re-analyzing the one or more messaging interactions based on the plurality of messaging abuse criteria to determine that the user account no longer meets the messaging abuse threshold; and
   lifting the restriction on the user account from transmitting messaging using the messaging service in response to the re-analyzing of the one or more messaging interactions.

7. The method of claim 1, wherein re-analyzing the one or more messaging interactions based on the plurality of messaging abuse criteria to determine that the user account no longer meets the messaging abuse threshold is in response to the one or more related messaging interactions comprising one or more destination user accounts of the one or more messaging interactions adding the user account as a contact with the messaging service.

8. The method of claim 1, further comprising:
receiving one or more related messaging interactions at the messaging service, the related messaging interactions related to the one or more messaging interactions received from the messaging client;
re-analyzing the one or more messaging interactions based on the plurality of messaging abuse criteria to determine that the user account meets a higher messaging abuse threshold; and
increasing the restriction on the user account in response to the re-analyzing of the one or more messaging interactions.

9. The method of claim 1, further comprising:
determining that the messaging abuse punishment history for the user account indicates that the user account has received a temporary ban threshold number of temporary bans; and
assigning the messaging ban duration as a permanent ban based on the determination that the messaging abuse punishment history for the user account indicates that the user account has received the temporary ban threshold number of temporary bans.

10. An apparatus, comprising:
a processor circuit on a device;
a messaging server component operative on the processor circuit to receive one or more messaging interactions from a messaging client on a client device at a messaging service, the messaging client associated with a user account for the messaging service; and impose a restriction on the user account from transmitting messaging using the messaging service for a duration based on a messaging ban duration;
an abuse monitoring component operative to analyze the one or more messaging interactions based on a plurality of messaging abuse criteria to determine that the user account meets a messaging abuse threshold; retrieve a messaging abuse punishment history for the user account, wherein the messaging abuse punishment history includes previous punishments imposed on the user account for previous messaging abuses; and
determine a messaging ban duration based on the messaging abuse punishment history and the determination that the user account meets the messaging abuse threshold.

11. The apparatus of claim 10, further comprising:
the abuse monitoring component operative to determine that the messaging abuse punishment history indicates that the user account was subjected to a previous messaging ban duration; and determine the messaging ban duration as a longer duration than the previous messaging ban duration, the messaging ban duration and the previous messaging ban duration comprising stages of an escalating messaging ban duration sequence.

12. The apparatus of claim 10, further comprising:
the messaging server component operative to disconnect the messaging client from the messaging service based on the imposing of the restriction on the user account; receive a login attempt from the messaging client on the client device at the messaging service; retrieve a user punishment education page based on a messaging abuse criterion used in determining that the user account meets the messaging abuse threshold, the user punishment education page comprising a messaging utility control operative to duplicate at least a portion of the one or more messaging interactions using messaging interaction techniques that avoid punishment by the messaging service; and transmit the user punishment education page to the messaging client in response to the login attempt.

13. The apparatus of claim 10, further comprising:
the messaging server component operative to receive one or more related messaging interactions at the messaging service, the related messaging interactions related to the one or more messaging interactions received from the messaging client; and
the abuse monitoring component operative to re-analyze the one or more messaging interactions based on the plurality of messaging abuse criteria to determine that the user account no longer meets the messaging abuse threshold; and lift the restriction on the user account from transmitting messaging using the messaging service in response to the re-analyzing of the one or more messaging interactions.

14. The apparatus of claim 10, wherein re-analyzing the one or more messaging interactions based on the plurality of messaging abuse criteria to determine that the user account no longer meets the messaging abuse threshold is in response to the one or more related messaging interactions comprising one or more destination user accounts of the one or more messaging interactions adding the user account as a contact with the messaging service.

15. The apparatus of claim 10, further comprising:
the messaging server component operative to receive one or more related messaging interactions at the messaging service, the related messaging interactions related to the one or more messaging interactions received from the messaging client;
the abuse monitoring component operative to re-analyze the one or more messaging interactions based on the plurality of messaging abuse criteria to determine that the user account meets a higher messaging abuse threshold; and increase the restriction on the user account in response to the re-analyzing of the one or more messaging interactions.

16. At least one non-transitory computer-readable storage medium comprising instructions that, when executed, cause a system to:
receive one or more messaging interactions from a messaging client on a client device at a messaging service, the messaging client associated with a user account for the messaging service;
analyze the one or more messaging interactions based on a plurality of messaging abuse criteria to determine that the user account meets a messaging abuse threshold;
retrieve a messaging abuse punishment history for the user account, wherein the messaging abuse punishment history includes previous punishments imposed on the user account for previous messaging abuses;
determine a messaging ban duration based on the messaging abuse punishment history and the determination that the user account meets the messaging abuse threshold; and
impose a restriction on the user account from transmitting messaging using the messaging service for a duration based on the messaging ban duration.

17. The non-transitory computer-readable storage medium of claim 16, comprising further instructions that, when executed, cause a system to:

disconnect the messaging client from the messaging service based on the imposing of the restriction on the user account;

receive a login attempt from the messaging client on the client device at the messaging service;

retrieve a user punishment education page based on a messaging abuse criterion used in determining that the user account meets the messaging abuse threshold, the user punishment education page comprising a messaging utility control operative to duplicate at least a portion of the one or more messaging interactions using messaging interaction techniques that avoid punishment by the messaging service; and transmit the user punishment education page to the messaging client in response to the login attempt.

18. The non-transitory computer-readable storage medium of claim 16, comprising further instructions that, when executed, cause a system to:

receive one or more related messaging interactions at the messaging service, the related messaging interactions related to the one or more messaging interactions received from the messaging client;

re-analyze the one or more messaging interactions based on the plurality of messaging abuse criteria to determine that the user account no longer meets the messaging abuse threshold; and lift the restriction on the user account from transmitting messaging using the messaging service in response to the re-analyzing of the one or more messaging interactions.

19. The non-transitory computer-readable storage medium of claim 16, wherein re-analyzing the one or more messaging interactions based on the plurality of messaging abuse criteria to determine that the user account no longer meets the messaging abuse threshold is in response to the one or more related messaging interactions comprising one or more destination user accounts of the one or more messaging interactions adding the user account as a contact with the messaging service.

20. The non-transitory computer-readable storage medium of claim 16, comprising further instructions that, when executed, cause a system to:

receive one or more related messaging interactions at the messaging service, the related messaging interactions related to the one or more messaging interactions received from the messaging client;

re-analyze the one or more messaging interactions based on the plurality of messaging abuse criteria to determine that the user account meets a higher messaging abuse threshold; and increase the restriction on the user account in response to the re-analyzing of the one or more messaging interactions.

* * * * *